United States Patent [19]

Nadkarni et al.

[11] Patent Number: 5,598,991
[45] Date of Patent: Feb. 4, 1997

[54] METHOD AND APPARATUS FOR DETECTING OSCILLATORY PHENOMENA INDICATIVE OF AIRFLOW SEPARATION

[75] Inventors: Arun A. Nadkarni, Kirkland; William F. Bryant, Bellevue, both of Wash.

[73] Assignee: The Boeing Company, Seattle, Wash.

[21] Appl. No.: 437,405

[22] Filed: May 12, 1995

[51] Int. Cl.$^6$ ................................. B64C 13/16
[52] U.S. Cl. .................. 244/203; 244/76 A; 244/194; 244/76 R
[58] Field of Search ............... 244/75 A, 76 C, 244/194, 195, 203, 76 R

[56] References Cited

U.S. PATENT DOCUMENTS

| | | |
|---|---|---|
| 2,492,252 | 12/1949 | Wing . |
| 4,017,045 | 4/1977 | Kirchhein ........................ 244/194 |
| 4,932,611 | 6/1990 | Horikawa . |
| 5,072,893 | 12/1991 | Chakravarty et al. ............ 244/194 |
| 5,170,969 | 12/1992 | Lin ................................... 244/194 |
| 5,224,667 | 7/1993 | Lacabanne ....................... 244/194 |
| 5,375,794 | 12/1994 | Bleeg . |
| 5,457,630 | 10/1995 | Palmer ............................. 244/203 |
| 5,458,304 | 10/1995 | Gilbert ............................. 244/195 |

Primary Examiner—Andres Kashnikow
Assistant Examiner—Tien Dinh
Attorney, Agent, or Firm—Christensen, O'Connor Johnson & Kindness PLLC

[57] ABSTRACT

A method and apparatus for detecting oscillatory phenomena indicative of airflow separation or sensor common mode oscillatory failure is disclosed. The oscillations of a differential pressure transducer that senses the pressure difference on the opposite sides of an airfoil are bandpass filtered to remove oscillations lying outside of a band of interest. Oscillation peaks lying within the passband that exceed a positive or negative threshold produce pulses that are counted. The counter value is decremented each time an alternating peak is not detected within one-half cycle of a minimum frequency. If the allowable count threshold is exceeded, a latch is set. Setting the latch produces a command that can be used to inhibit the operation of systems that rely on data produced by the differential pressure transducer. An alternative path senses the position of a control element (e.g., rudder pedal position) and sets the latch if the control element position reaches an extreme value likely to produce an oscillation condition at the pressure differential transducer. The latch is reset if the oscillation condition subsides for a predetermined period of time. This provides protection against transient conditions without inhibiting control system operation for the balance of a flight.

30 Claims, 1 Drawing Sheet

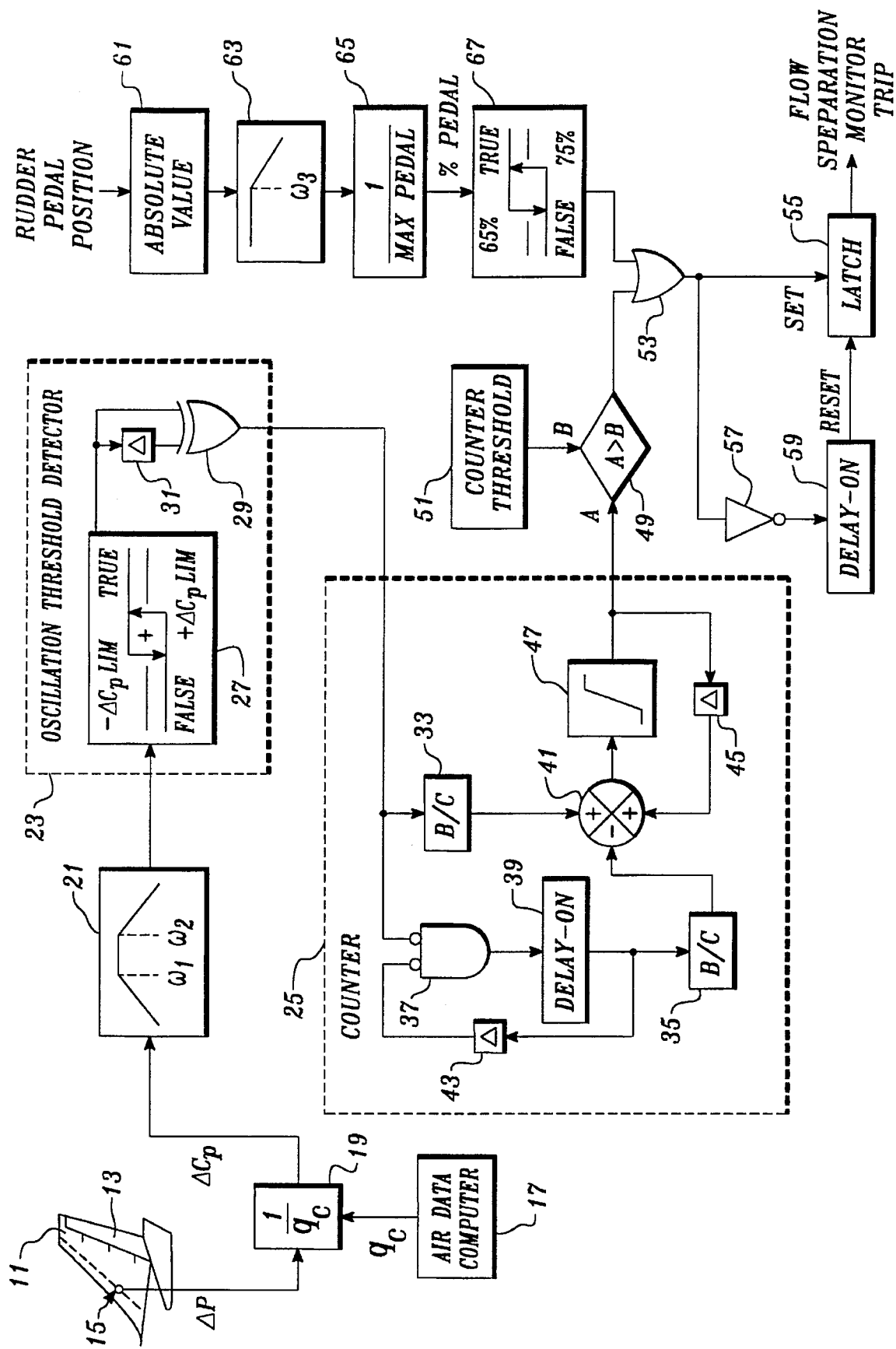

METHOD AND APPARATUS FOR DETECTING OSCILLATORY PHENOMENA INDICATIVE OF AIRFLOW SEPARATION

TECHNICAL AREA

This invention relates to control systems and, more particularly, to airplane control systems.

BACKGROUND OF THE INVENTION

In the past, a wide variety of systems for controlling the directional control elements (e.g., the ailerons, elevators, and rudder) of airplanes have been developed. In recent years, fly-by-wire control systems have been developed to replace cable and hydraulic control systems in a variety of airplanes, including commercial and other jet transport airplanes. Regardless of the nature of the control system incorporated in an airplane, one problem associated, particularly with commercial jet airplanes, has been ride quality in the aft cabin of the airplane in the presence of wind gusts and atmospheric turbulence.

When flying in discrete wind gusts and atmospheric turbulence, the aft portion of the cabin of commercial and other transport airplanes experiences higher levels of lateral acceleration than do the forward and middle portions of the cabin. The increased level of lateral acceleration is not only uncomfortable from a passenger ride quality standpoint, but it can also create a difficult work environment for cabin crews of commercial jet airplanes, since the galley of many such airplanes is located in the aft cabin. The higher aft cabin lateral acceleration in response to discrete wind gusts and atmospheric turbulence of commercial jet airplanes is due to the rigid body weathercock stability and the flexible body bending of the fuselage of such airplanes. The principal cause of the higher aft cabin lateral acceleration is the lateral force produced by the lateral component of wind gusts and atmospheric turbulence impinging on the vertical stabilizer of the airplane. As is well known to those skilled in the art, aft body lateral acceleration can be significantly reduced by reducing or countering the effect of the vertical stabilizer of an airplane in wind gusts and atmospheric turbulence.

In the past, conventional modal suppression systems have been developed to reduce the effect of atmospheric turbulence and wind gusts in the aft cabin of commercial jet airplanes. Modal suppression systems employ lateral accelerometers to sense lateral side loads. The sensed information is used to generate rudder commands designed to attenuate the flexible body response to atmospheric turbulence and wind gusts. The signals produced by modal suppression systems are filtered to remove components of the signals lying outside of the flexible bending mode frequencies of the body (fuselage) of the airplane, namely the first body bending mode frequency, which lies between 2 and 4 Hz. Because modal suppression systems add damping to body oscillations after discrete wind gusts or atmospheric turbulence have excited the body to start such oscillations, modal suppression systems actually attenuate motion due to flexible coupling, rather than act to prevent such motion.

Recently, a method and apparatus has been developed for reducing undesired airplane aft cabin sideways motions resulting from atmospheric turbulence and wind gusts that uses a vertical stabilizer differential pressure sensor to produce a signal that is used to move the rudder on the vertical stabilizer in a direction that relieves vertical stabilizer loads. See U.S. Pat. No. 5,375,794, titled "Apparatus and Method for Reducing Aircraft Loads Resulting From Atmospheric Turbulence and Gusts," by Robert J. Bleeg (hereinafter '794 patent), the subject matter of which is incorporated herein by reference. The method and apparatus described in the '794 patent produces a rudder command that has been filtered to respond to wind gusts and air turbulence at and above the Dutch roll frequency range of an airplane. The filter has a corner frequency, $f_c$, equal to 1 rad/sec. This corner frequency was selected to achieve the best balance between providing wind gust and atmospheric turbulence vertical stabilizer load alleviation and retaining good airplane handling qualities.

While the method and apparatus described in the '794 patent is a substantial improvement over modal suppression systems, it is subject to improvement, particularly when used in a fly-by-wire airplane control system. An improved method and apparatus of the general type described in the '794 patent is described in U.S. patent application Ser. No. 08/440,339, titled "Method and Apparatus for Reducing Unwanted Sideways Motion in the Aft Cabin and Roll-Yaw Upsets of an Airplane Due to Atmospheric Turbulence and Wind Gusts," by William F. Bryant et al. (Disclosure BOCO18417), filed concurrently herewith, the subject matter of which is incorporated herein by reference.

One of the potential problems associated with the apparatus and methods described in the '794 patent and in the foregoing patent application is that the rudder modification control provided by such methods and apparatus could cause rudder motion to exceed allowable structural limits in the event flow separation occurs where vertical stabilizer differential pressure is sensed. The present invention is directed to providing a method and apparatus for detecting airfoil flow separation and/or other aircraft conditions likely to produce airfoil flow separation and providing a control signal suitable for deactivating a selected control function, such as a rudder modification command produced by control systems of the type described in the '794 patent or the foregoing patent application.

SUMMARY OF THE INVENTION

In accordance with this invention, a method and apparatus for detecting an oscillatory signal indicative of airflow separation and producing an inhibiting command is provided. The signal produced by a differential pressure transducer that senses the pressure differences on opposite sides of an airfoil (e.g., an airplane vertical stabilizer) is monitored. Oscillations of the differential pressure signal lying within a predetermined frequency passband that alternately exceed a positive and negative threshold produce pulses that are counted. The count value is decremented each time an alternating peak is not detected within the time interval required for ½ cycle of a minimum bandpass frequency. If the allowable count threshold is exceeded for a specified number of cycles, a latch is set. Setting the latch produces a command that can be used to inhibit the operation of systems that rely on data produced by the differential pressure transducer.

In accordance with further aspects of this invention, an alternate transducer senses the position of a control element (e.g., the airplane's rudder pedals) and sets the latch if the control element position reaches an extreme value that is likely to cause the differential pressure transducer signal to oscillate.

In accordance with other aspects of this invention, if the oscillations subside, the latch is reset after a predetermined delay, allowing the inhibited control function to be re-admitted.

As will be readily appreciated from the foregoing summary, the invention provides a frequency/amplitude monitor that detects the oscillation of sensed signals and uses the sensed information to produce a command that can be used to inhibit the operation of systems that rely on the sensed signals. Since the oscillation of differential pressure sensor signals is indicative of airflow separation, the invention can be used to produce an airplane control system inhibit command when flow separation occurs on any lifting surface, such as the wing or the horizontal and vertical stabilizers of an airplane. More specifically, when a lift producing device, such as a vertical stabilizer, approaches maximum lift, the airflow across the lift-producing device will alternately separate and reattach, creating an oscillating differential pressure signal across the device. In accordance with the invention, this information is used to prevent the control system for a lift producing device, namely a vertical stabilizer, from causing compensating rudder motion to exceed allowable structural limits. That is, sensing of the oscillatory motion is used to produce a command that inhibits the operation of a control function that could negatively impact the structural integrity of the airplane. Further, if the oscillatory condition subsides, the monitor is reset after a predetermined delay and the control function is re-admitted. Since flow separation is frequently a temporary phenomenon, which exists only during extreme maneuvers, the monitor reset logic allows for a temporary inhibit without disabling the control function for the balance of a flight. The frequency/amplitude monitor will detect flow separation on any lifting surface or sensor common mode oscillatory failures in the frequency range of interest.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying FIGURE which illustrates a preferred embodiment of this invention.

DETAILED DESCRIPTION OF THE PREFERRED EMBODIMENT

While, as will be better appreciated from the following description, the invention was designed for use in a "fly-by-wire" airplane control system, and is described in connection with such a system, it is to be understood the invention can be incorporated in other types of airplane control systems, if desired. Further, as is conventional, while the invention is illustrated and described in the form of a control law containing discrete blocks designed to accomplish specific functions, it is to be understood that the invention can be actually implemented in various ways. For example, the various functions of the illustrated control law can be carded out by a suitably programmed digital computer system. Alternatively, the functions can be carried out by digital or analog circuits.

The FIGURE illustrates a monitor formed in accordance with the present invention coupled to the vertical stabilizer 11 of an airplane, such as the Boeing 777. As will be better understood from the following description, the monitor responds to two differential inputs. One input causes the monitor to trip if differential pressure sensor oscillations indicate that airflow separation across an airfoil is occurring. The other input causes the monitor to trip when a control element, such as the rudder pedals of an airplane, are moved to such an extreme position that differential pressure sensor oscillations are highly likely to occur.

As is conventional, the vertical stabilizer 11 includes a rudder 13. The monitor receives signals from a differential pressure transducer 15 mounted along the ten percent chord line of the vertical stabilizer 11. More specifically, the differential pressure transducer 15 senses pressure on the opposite sides of the vertical stabilizer 11 and produces a differential pressure signal designated $\Delta P$. Attention is directed to co-pending U.S. patent application Ser. No. 08/440,339, titled "Method and Apparatus for Reducing Unwanted Sideways Motion in the Aft Cabin and Roll-Yaw Upsets of an Airplane Due to Atmospheric Turbulence and Wind Gusts," by William F. Bryant et at., filed concurrently herewith (BOCO18417), the subject matter of which has been incorporated herein by reference, for more information regarding the location of the differential pressure transducer 15.

The differential pressure transducer signal $\Delta P$ is divided by an impact pressure signal designated $q_c$ produced by the air data computer 17 of the airplane. See block 19. As described in the foregoing patent application, dividing $\Delta P$ by $q_c$ provides airspeed gain compensation. The result of the division is a differential pressure coefficient designated $\Delta C_p$. $\Delta C_p$ is, thus, a differential pressure coefficient computed from the $\Delta P$ data produced by the differential pressure sensor 15 scaled for current flight conditions. As will be appreciated by those skilled in the airplane control system art, scaling $\Delta P$ is necessary because the air loads on the vertical stabilizer and, therefore, the amount of rudder deflection used to alleviate atmospheric turbulence and wind gust loads is a function of the impact pressure variable, $q_c$, as well as the actual value of the signal produced by the pressure transducer 15. Obviously, other environments in which the invention is utilized may require other scaling of the signal produced by the differential pressure transducer.

The differential pressure coefficient, $\Delta C_p$, is passband filtered as shown by block 21 to eliminate oscillations lying outside of a passband of interest. The bandpass filter attenuates amplitudes below $\omega_1$ and above $\omega_2$. Thus, the frequency range from $\omega_1$ to $\omega_2$ is the monitor operating band and will vary with a specific application of the invention.

The upper boundary, $\omega_2$, is based on the bandwidth of the surface controller. In the case of the embodiment of the invention illustrated in the FIGURE, $\omega_2$ is set equal to the bandwidth of the rudder actuator. The lower boundary, $\omega_1$, is chosen to be above the normal operating frequency of the control function and is selected based on the premise that the differential pressure sensor and/or controller response above this frequency is undesirable or non-normal. For the embodiment of the invention illustrated in the FIGURE, $\omega_1$ is set at approximately 2.0 Hz, which is above the frequency range of the expected atmospheric turbulence and wind gusts to be encountered, but below the first body bending mode of the airplane.

The bandpass filter, in essence, rejects or eliminates oscillations lying in two frequency ranges-those below $\omega_1$ and those above $\omega_2$. Pressure oscillations in the frequency range below $\omega_1$ are mostly due to atmospheric turbulence and wind gusts, which have a frequency spectrum in this range. The method and apparatus described in the '794 patent and the foregoing patent application are designed to reduce unwanted sideways motion in the aft cabin of an airplane due to atmospheric turbulence and wind gusts. Since the present invention is designed not to inhibit the production of rudder modification commands designed to reduce unwanted sideways motion, oscillations that might result from atmospheric turbulence and wind gusts must be rejected in order to prevent such oscillations from producing an inhibit command. This is accomplished by choosing an $\omega_1$ that lies above the atmospheric turbulence and wind gust frequency range.

The rudder actuator bandwidth of $\omega_2$ will naturally attenuate pressure oscillations in the frequency region above $\omega_2$. As a result, the rudder will not respond to frequency commands in regions above $\omega_2$. Thus, there is no need for the invention to detect or respond to oscillations in the frequency range above $\omega_2$.

In summary, the only frequency region in which the oscillating differential pressure signal could create a rudder command that could cause rudder movement exceeding allowable structural limits lies below $\omega_2$. Oscillations below $\omega_1$ are rejected because such oscillations could result from atmospheric turbulence and wind gusts rather than from flow separation. By rejecting oscillations below $\omega_1$, the bandpass filter removes steady state offsets such that oscillations about a static bias are detected.

The oscillations between $\omega_1$ and $\omega_2$ are analyzed because they identify a potential hazard. Specifically, the relative phasing of oscillations between $\omega_1$ and $\omega_2$ due to aerodynamic buffeting characteristics and computational delays, etc., can produce a command that could cause the rudder to move in the wrong direction, thereby adding to vertical stabilizer loads instead of reducing vertical stabilizer loads. The monitor detects oscillation in the frequency range that could produce such a command and, as described next, provides a trip signal that can be used to disable the operation of systems such as those described in the '794 patent and the foregoing patent application that produce rudder modification commands designed to alleviate the effect of atmospheric turbulence and wind gusts on the aft cabin of an airplane.

Returning to the FIGURE, the bandpass filtered $\Delta C_p$ signal is analyzed and the number of positive and negative excursions of $\Delta C_p$ that fall within the bandwidth of interest and exceed a predetermined threshold level are counted. Analysis of the band pass filtered $\Delta C_p$ signal is accomplished by an oscillation threshold detector 23. The oscillation threshold detector produces a pulse each time a $\Delta C_p$ excursion exceeds a predetermined threshold in one direction after the threshold has been exceeded in the opposite direction. Pulses produced by the oscillation threshold detector 23 are counted by a counter 25, which counts the number of half cycles of threshold exceedances. As will be better understood from the following description, the counter includes limits and thresholds that are set so as to trip before sufficient cycles occur to create a structural hazard. As also will be better understood from the following description, the counter 25 is decremented by one every time an alternating peak is not detected within ½ cycle of the minimum cutoff frequency, $\omega_1$, of the bandpass filter 21.

While preferably implemented in software form, for ease of illustration, the oscillation threshold detector 23 is illustrated as comprising a threshold and hysteresis element 27, a previous-value storage element 31, and an exclusive OR gate 29. The threshold and hysteresis element 27 sets the positive and negative detection thresholds and prevents a signal that rings about a threshold from producing more than one pulse. That is, the threshold and hysteresis element 27 requires a zero crossing after a signal has passed a threshold in one direction or the other before another threshold exceedance is accepted as valid. The output of the threshold and hysteresis element 27 is applied to one input of the exclusive OR gate 29 and to the input of the previous-value storage element 31. The output of the previous-value storage element 31 is applied to the second input of the exclusive OR gate 29. Thus, the exclusive OR gate 29 compares the current output of the threshold and hysteresis element 27 with the immediately past cycle output of the threshold and hysteresis elements, i.e., the previous-value storage element 31. If the exceedances are in opposite directions, the exclusive OR gate 29 produces a pulse.

The counter 25, which is also preferably implemented in software form, is depicted in element form as comprising two Boolean-to-continuous (B/C) converters 33 and 35, a two-input negative NAND gate 37, a delay-on 39, a three-input summer 41, two previous-value storage elements 43 and 45, and a limiter 47. The three-input summer 41 has two positive inputs and a negative input.

The output of the exclusive OR gate 29 is applied to the input of the first B/C converter 33 and to one input of the negative NAND gate 37. The output of the first B/C converter 33 is applied to one of the positive inputs of the three-input summer 41. The output of the negative NAND gate 37 is applied through the delay-on 39 to the input of the second B/C converter 35. The output of the second B/C converter is applied to the negative input of the three-input summer 41. The delay-on 39 has a period equal to one-half the period of $\omega_1$, i.e., one-half the period of the minimum cutoff frequency of the bandpass filter 21. The delay-on 39 delays the transition from a false state to a true state, but transitions immediately from true to false.

The output of the delay-on 39 is applied to the input of the first previous-value storage element 43, and the output of the first previous-value storage element 43 is applied to the second input of the negative NAND gate 37. The output of the three-input summer is applied to the input of the limiter 47, and the output of the limiter is applied to the input of the second previous-value storage element 45. The output of the second previous-value storage element 45 is applied to the second positive input of the three-input summer 41.

In operation, the pulses produced by the exclusive OR gate 29 are converted from a discrete true or false state to a numerical one (1) or zero (0), respectively, by the first B/C converter 33. The negative NAND gate 37, the delay-on 39, the first previous-value storage element 43, and the second B/C converter 35 cause the counter to decrement by one every time an alternating peak is not detected within one-half the cycle of the minimum frequency of $\omega_1$. The limiter 47 limits the magnitude of the count value. The second previous-value storage element 45 stores a value that is increased or decreased by the outputs of the first and second B/C converters 33 and 35.

The output of the counter, namely, the output of the limiter 47, which is designated A, is compared in a comparator 49 with a value stored in a counter threshold element 51. The output of the counter threshold element is denoted B. Thus, the comparator 49 compares A and B. The output of the comparator switches from a low state to a high state when A is greater than B. Preferably, the counter threshold element 51 stores a value greater than or equal to the counts generated in 1½ cycles. Thus, the output of the comparator 49 switches from a low state to a high state if the allowable threshold is exceeded for a specified number of cycles, namely, 1½ cycles or more. The counter threshold magnitude will vary with the particular application of the invention and the number of cycles required to produce an excessive structural load. The threshold value may also be specified to change as a function of flight conditions or airplane configuration, e.g., flaps up or down.

The output of the comparator 49 is applied to one input of an OR gate 53. The output of the OR gate 53 is applied to the set input of a latch 55. The output of the latch 55 is a command designated flow separation monitor trip. This command is used to inhibit the operation of the portion of control systems that depend on data from the differential pressure sensor 15, such as a rudder control system of the type illustrated and described in the '794 patent and the patent application referenced above and incorporated herein by reference.

The output of the OR gate 53 is also applied through an inverter 57 to a delay-on 59. The output of the delay-on is applied to the reset input of the latch 55. As a result, the latch is automatically reset if the monitor returns to within the threshold limit continuously for the number of cycles determined by the delay-on 59. Preferably, the delay is set to equal 10 or more $\omega_1$ cycles to confirm that the oscillations have subsided and avoid the nuisance of on/off cycling of the inhibited control system. In any event, the length of the delay should be set so that initial transients of the filters of the inhibited control system are allowed to settle down before the monitor is reset. Providing a monitor reset allows the monitor to protect against transient maneuvers without disabling the control function inhibited by the monitor for the balance of a flight once the monitor is tripped.

The inclusion of the delay-on 59 results in a relatively uncomplicated design that has no need for complicated filter reinitialization computations prior to uninhibiting the related control function. As with other elements shown in the FIGURE, preferably, the OR gate 53, the latch 55, the inverter 57, and the delay are implemented in software form.

The monitor illustrated in the FIGURE has a second control path that senses extreme movement of a related control element that is likely to create tripping differential pressure oscillations. For example, large rudder pedal commands can potentially generate large slide slip angles that will lead to flow separation, or erratic differential pressure steps in response to abrupt rudder pedal movements. Erratic differential pressure signals can produce unwanted transients throughout the rudder control loop. In both instances, a maximum lift condition likely to cause differential pressure oscillations that could result in a rudder command causing rudder movement in excess of allowable limits could occur. Rather than relying solely on differential pressure oscillations, the monitor includes a backup or second control path that responds to control element movement. This additional conservatism may or may not be required in actual embodiments of the invention.

As shown in the FIGURE, the second control path begins by monitoring the absolute value of control element (e.g., rudder pedal) position. See block 61. The absolute value of the rudder pedal position is filtered by a filter 63 that matches the rudder actuation bandwidth. The filtered value is divided by the maximum pedal value to create a percent rudder pedal value that trips a threshold and hysteresis element 67 when a predetermined value is exceeded. The threshold and hysteresis element is shown in the FIGURE to trip at seventy-five percent (75%) and reset at sixty-five percent (65%). This hysteresis band is specified to avoid nuisance on/off cycling of the control function inhibit. The rudder pedal monitor trip threshold is set beyond the normal engine-out rudder trim and crosswind approach requirements. The rudder pedal control path, therefore, has little impact on normal operations and protects again spurious rudder inputs during extreme maneuvers.

The output of the threshold and hysteresis element 67 is applied to a second input of the OR gate 53. As a result, the second control path of the monitor uses pilot rudder command (through manual movement of the rudder pedal) measured by the percent of maximum pedal to set the monitor trip latch 55. As with other elements of the monitor shown in the FIGURE, preferably, the absolute value 61, the filter 63, the maximum pedal 65, and the threshold and hysteresis element 67 are implemented in software form.

As noted above, the second control path provides additional conservatism that may or may not be required for a specific application of the invention. As an alternate to rudder pedal position, rudder surface position or, more directly, the absolute value of ΔP could also be utilized to provide the input data for the second control path. As with the first control path, i.e., the pressure differential control path, the fundamental principle is to disable the related control function when the maximum lift condition is approached—in this case, intentionally, through the use of the rudder pedal.

As will be readily appreciated from the foregoing description, the invention provides a frequency/amplitude monitor that protects an airplane control law from oscillatory data inputs to the control law loop. In the specifically described embodiment of the invention, as the vertical stabilizer approaches maximum lift, the airflow will alternately separate and reattach, creating an oscillating differential pressure signal that could create rudder motion that could potentially exceed allowable structural limits. Whether a specific oscillating control signal will create rudder motion that could potentially exceed structural allowable limits will depend on the relative phasing of the oscillating pressure signal caused by the aerodynamic buffeting of the vertical stabilizer. In this regard, as will be readily appreciated by those skilled in the art, structural load limits are usually most restrictive at certain frequencies, such as the first body bending and first vertical stabilizer bending frequency of the related airplane. In the illustrated embodiment of the invention, flow separation is a concern because the resulting buffeting has constant energy from approximately 2 Hz to more than 10 Hz. A frequency/amplitude monitor formed in accordance with the invention detects oscillating signals in the frequency range of interest that lie above an amplitude threshold of interest and uses the detected information to modify or disable a related control function such as by zeroing the function. In addition to detecting oscillatory phenomena indicative of airfoil airflow separation, as will be readily appreciated by those skilled in the art, the invention will also detect sensor common mode oscillatory failure.

After the oscillatory condition subsides, the monitor is reset and, after a predetermined delay, the control function is reengaged. This protects against transient maneuvers without disabling the function for the balance of a flight.

While a preferred embodiment of the invention has been illustrated and described, it will be appreciated that, within the scope of the appended claims, various changes can be made therein without departing from the spirit and scope of the invention.

The embodiments of the invention in which an exclusive property or privilege is claimed are defined as follows:

1. A method of detecting oscillatory phenomena indicative of airfoil airflow separation or sensor common mode oscillatory failure and producing a trip command comprising:

detecting the differential pressure on opposite sides of an airfoil and producing related differential pressure data;

scaling said differential pressure data for current flight conditions to produce scaled differential pressure data;

bandpass filtering said scaled differential pressure data to eliminate perturbations outside of a frequency range of interest to produce bandpass filtered, scaled differential pressure data;

analyzing said bandpass filtered, scaled differential pressure data to locate excursions of said bandpass filtered, scaled differential pressure data that exceed a predetermined threshold in both positive and negative directions and producing a pulse each time a threshold exceedance in one direction occurs after a threshold exceedance occurs in the opposite direction; and counting said pulses and producing a trip command if said pulse count exceeds a predetermined threshold.

2. The method claimed in claim 1 including the step of setting a latch if said pulse count exceeds a predetermined threshold, the output of said latch forming said trip command.

3. The method claimed in claim 2, wherein said pulse count is decremented by one every time a threshold exceedance is not detected within one-half cycle of the minimum frequency of said bandpass filtering.

4. The method claimed in claim 3 including the step of resetting said latch if said pulse count drops below said predetermined threshold for a predetermined period of time.

5. The method claimed in claim 4, wherein said predetermined period of time is equal to a predetermined number of cycles of one end of the range of said bandpass filtering.

6. The method claimed in claim 5 wherein said end of the range of said bandpass filtering is the lower end.

7. The method claimed in claim 6 including:

monitoring the position of a control element; and setting said latch if a movement of said control element exceeds a predetermined control element limit.

8. The method claimed in claim 2 including the step of resetting said latch if said pulse count drops below said predetermined threshold for a predetermined period of time.

9. The method claimed in claim 8, wherein said predetermined period of time is equal to a predetermined number of cycles of one end of the range of said bandpass filtering.

10. The method claimed in claim 9 wherein said end of the range of said bandpass filtering is the lower end.

11. The method claimed in claim 10 including:

monitoring the position of a control element; and setting said latch if a movement of said control element exceeds a predetermined control element limit.

12. The method claimed in claim 2 including:

monitoring the position of a control element; and setting said latch if a movement of said control element exceeds a predetermined control element limit.

13. Apparatus for detecting oscillatory phenomena indicative of airfoil air flow separation or sensor common mode oscillatory failure and producing a trip command comprising:

(a) a sensor for detecting differential pressure on the opposite sides of an airfoil and producing a relating differential pressure signal; and (b) a monitor for monitoring the output of said sensor and producing a trip command, said monitor comprising:

(i) a scaler for scaling the output of said sensor for current flight conditions;

(ii) a filter for bandpass filtering said scaled output of said sensor;

(iii) an oscillation threshold detector for analyzing said bandpass filtered, scaled output of said sensor to locate excursions of said bandpass filtered, scaled output of said sensor that exceed a predetermined threshold in positive and negative directions and producing a pulse each time a threshold exceedance in one direction occurs after an exceedance occurs in the opposite direction;

(iv) a counter for counting said pulses; and (v) a latch for producing a trip command when the number of pulses counted by said counter exceeds a predetermined threshold.

14. The apparatus claimed in claim 13 wherein said scaler scales the output of said sensor by dividing the output of said sensor by a factor that provides airspeed gain compensation.

15. The apparatus claimed in claim 14 wherein the lower cutoff frequency of said bandpass filter removes frequency oscillations in the range likely to be produced by atmospheric turbulence and wind gusts.

16. The apparatus claimed in claim 15, wherein said airfoil is a vertical stabilizer and wherein the upper cutoff frequency of said bandpass filter is approximately equal to the lower end of the bandwidth at which the rudder of said vertical stabilizer will not respond to frequency commands.

17. The apparatus claimed in claim 15 wherein said oscillation threshold detector includes a hysteresis element for preventing more than one threshold exceedance in one direction from producing a pulse prior to a zero crossing transition.

18. The apparatus claimed in claim 17 wherein said counter includes a decrementer for decrementing the count value produced by said counter if a threshold exceedance does not occur within one one-half cycle of the lower cutoff frequency of said bandpass filter.

19. The apparatus claimed in claim 18 wherein said counter includes:

a first Boolean-to-continuous converter for converting the pulse output of said oscillation threshold detector into a continuous value;

a two-input negative NAND gate having one input for receiving the pulse output of said oscillation threshold detector;

a delay for receiving the output of said two-input negative NAND gate;

a first previous-value storage element for receiving the output of said delay and applying the output to the second input of said two-input negative NAND gate;

a second Boolean-to-continuous converter for receiving the output of said delay;

a three-input summer having two positive inputs and a negative input, one of said positive inputs receiving the output of said first Boolean-to-continuous converter and receiving the output of said second Boolean-to-continuous converter;

a limiter for receiving the output of said three-input summer; and a second previous-value storage element for receiving the output of said limiter and applying said output to the second positive input of said three-input summer.

20. The apparatus claimed in claim 19 including a comparator for comparing the output of said limiter with a predetermined threshold value, the output of said comparator being applied to said latch.

21. The apparatus claimed in claim 20 including an inverter for receiving the output of said comparator and a delay for receiving the output of said inverter and applying the output to the reset input of said latch.

22. The apparatus claimed in claim 21 including an alternative path for monitoring the position of a control element and operating said latch if the movement of said control element exceeds a predetermined control element limit.

23. The apparatus claimed in claim 13 wherein the lower cutoff frequency of said bandpass filter removes frequency oscillations in the range likely to be produced by atmospheric turbulence and wind gusts.

24. The apparatus claimed in claim 23, wherein said airfoil is a vertical stabilizer and wherein the upper cutoff frequency of said bandpass filter is approximately equal to the lower end of the bandwidth at which the rudder of said vertical stabilizer will not respond to frequency commands.

25. The apparatus claimed in claim 13 wherein said oscillation threshold detector includes a hysteresis element for preventing more than one threshold exceedance in one direction from producing a pulse prior to a zero crossing transition.

26. The apparatus claimed in claim 13 wherein said counter includes a decrementer for decrementing the count value produced by said counter if a threshold exceedance does not occur within one one-half cycle of the lower cutoff frequency of said bandpass filter.

27. The apparatus claimed in claim 13 wherein said counter includes:

a first Boolean-to-continuous converter for converting the pulse output of said oscillation threshold detector into a continuous value;

a two-input negative NAND gate having one input for receiving the pulse output of said oscillation threshold detector;

a delay for receiving the output of said two-input negative NAND gate;

a first previous-value storage element for receiving the output of said delay and applying the output to the second input of said two-input negative NAND gate;

a second Boolean-to-continuous converter for receiving the output of said delay;

a three-input summer having two positive inputs and a negative input, one of said positive inputs receiving the output of said first Boolean-to-continuous converter and receiving the output of said second Boolean-to-continuous converter;

a limiter for receiving the output of said three-input summer; and a second previous-value storage element for receiving the output of said limiter and applying said output to the second positive input of said three-input summer.

28. The apparatus claimed in claim 13 including a comparator for comparing the output of said limiter with a predetermined threshold value, the output of said comparator being applied to said latch.

29. The apparatus claimed in claim 28 including an inverter for receiving the output of said comparator and a delay for receiving the output of said inverter and applying the output to the reset input of said latch.

30. The apparatus claimed in claim 13 including an alternative path for monitoring the position of a control element and operating said latch if the movement of said control element exceeds a predetermined control element limit.

\* \* \* \* \*